United States Patent
Blair et al.

(10) Patent No.: US 7,573,829 B2
(45) Date of Patent: Aug. 11, 2009

(54) METHOD AND APPARATUS FOR LOW OVERHEAD NETWORK PROTOCOL PERFORMANCE ASSESSMENT

(75) Inventors: Colin Blair, Westleigh (AU); Kevin Chan, Ryde (AU); Christopher R. Gentle, Gladesville (AU); Neil Hepworth, Artarmon (AU); Andrew W. Lang, Epping (AU)

(73) Assignee: Avaya Inc., Basking Ridge, NJ (US)

( * ) Notice: Subject to any disclaimer, the term of this patent is extended or adjusted under 35 U.S.C. 154(b) by 613 days.

(21) Appl. No.: 11/224,797

(22) Filed: Sep. 12, 2005

(65) Prior Publication Data

US 2007/0058555 A1     Mar. 15, 2007

(51) Int. Cl.
*G01R 31/08* (2006.01)
*G06F 15/16* (2006.01)

(52) U.S. Cl. .................. 370/250; 370/244; 370/245; 709/230

(58) Field of Classification Search ............ 370/248, 370/250, 251, 252, 253, 244, 245, 389, 395.5, 370/466; 709/230, 229, 238, 245; 714/712; 375/259
See application file for complete search history.

(56) References Cited

U.S. PATENT DOCUMENTS

| | | | |
|---|---|---|---|
| 5,467,342 A * | 11/1995 | Logston et al. ............ 370/253 |
| 5,864,563 A | 1/1999 | Ratcliffe | |
| 5,931,961 A * | 8/1999 | Ranganathan et al. ....... 714/712 |
| 6,041,042 A * | 3/2000 | Bussiere ................... 370/245 |
| 6,272,113 B1 * | 8/2001 | McIntyre et al. ............ 370/248 |
| 6,591,306 B1 * | 7/2003 | Redlich ...................... 709/245 |
| 6,732,182 B1 * | 5/2004 | Beverly, IV ................ 709/230 |
| 6,940,821 B1 * | 9/2005 | Wei et al. ................... 370/244 |
| 2003/0188001 A1 * | 10/2003 | Eisenberg et al. ........... 709/229 |
| 2004/0090921 A1 | 5/2004 | Russell | |
| 2005/0018666 A1 * | 1/2005 | Davila et al. ................ 370/389 |

(Continued)

FOREIGN PATENT DOCUMENTS

WO    WO 01/88734 A1    11/2001

OTHER PUBLICATIONS

IP Measurement Protocol (IPMP), McGregor, IETF Standard-Working-Draft, Internet Engineering Task Force, IETF, CH, No. 4, Feb. 2004, XP015032290 ISSN: 0000-0004.

(Continued)

*Primary Examiner*—Aung S Moe
*Assistant Examiner*—Awet Haile
(74) *Attorney, Agent, or Firm*—Sheridan Ross P.C.

(57) ABSTRACT

A method and apparatus for testing network performance are provided. In data provided by an application on a first host for transport or communication to an application associated with a second host according to a first data transport protocol is intercepted at the first host and wrapped or encapsulated in a test data packet formatted according to a second data transport protocol. The test data packet formatted according to the second data transport protocol includes, in addition to data comprising all or a portion of the original data packet, instrumentation information. The test data packet is then delivered to the second host, which unpacks the original data packet and the instrumentation information. A response packet containing instrumentation information may be sent from the second host to the first host to provide roundtrip performance metrics.

16 Claims, 6 Drawing Sheets

U.S. PATENT DOCUMENTS

2005/0021841 A1* 1/2005 Yoshimoto .................. 709/238
2006/0007953 A1* 1/2006 Vesma et al. ................ 370/466
2006/0262800 A1* 11/2006 Martinez et al. ....... 370/395.52
2008/0273605 A1* 11/2008 Kennedy et al. ............ 375/259

OTHER PUBLICATIONS

European Search Report for counterpart EP application, Application No. 06254449.9.

European Examination Report for Application No. EP 06 -254449, mailed Jan. 29, 2008.

Background of the invention for the above-captioned application (previously provided).

Official Action for Canadian Application No. 2,545,579, mailed Jan. 21, 2009, pp. 1-3.

* cited by examiner

METHOD AND APPARATUS FOR LOW OVERHEAD NETWORK PROTOCOL PERFORMANCE ASSESSMENT

FIELD OF THE INVENTION

The present invention is directed to network performance testing. In particular, network performance is tested by encapsulating data intended for transmission using a first protocol in a data packet formatted according to a second protocol and including test information.

BACKGROUND

Networks interconnecting computers or other hosts to one another are increasingly used to support real time communications, in addition to the transfer of data files. When use of a computer network in connection with voice telephony, video telephony, or other real time communications is desired, it is often advisable to test the network in order to determine whether a sufficient level or quality of service can be provided for such uses. For example, packet loss rates, transmit time (delay) and arrival time variations (jitter) of data packets all must be within certain limits in order to provide an acceptable level of service for real time communications. Furthermore, the network should be capable of supporting one or more quality of service enabling technologies, such as the resource reservation protocol (RSVP).

In order to assess the ability of a data network to support real time communications, such as Internet protocol (IP) telephony, probes and sniffers to generate network traffic and measure network performance by observing characteristics such as packet loss, jitter, delay and support for quality of service enabling technologies usually must be deployed. However, many current Internet protocol networks, such as IPv.4 networks, are restricted in the number of spare IP addresses left to allocate. Therefore, the introduction of probes or new traffic onto a network can have a detrimental effect on the existing traffic and network capacity. In particular, the deployment of probes and sniffers on a network can compromise measurements of that network's performance. Also, by adding new traffic, more of the available network bandwidth and processing power is consumed.

In addition to problems with network congestion and capacity that can be introduced by adding probes, some systems for performing such testing require the addition of hardware to networks. Such hardware can be in the form of standalone computers, single board computers or servers. Furthermore, even if probes are deployed as software applications on existing network entities, the problems noted above with respect to the addition of network traffic and network entities remain. Furthermore, test facilities that are added as software to existing network entities as an additional application compete with other applications on the network entity for resources, potentially adversely affecting the performance of the network entity.

SUMMARY

Embodiments of the present invention are directed to solving these and other problems and disadvantages of the prior art. According to embodiments of the present invention, existing traffic sent between network hosts in a network is used to test network performance. In particular, embodiments of the present invention instrument the network stack of network hosts in order to encapsulate or wrap the data or traffic in the form of one or more test data packets formatted in accordance with a data transfer protocol that is different than the data transfer protocol that would normally be used to send the data to another host. In addition, embodiments of the present invention add information for transmission with encapsulated data packets that is used in connection with performance testing. Accordingly, existing or native traffic can be sent according to a protocol to be tested, rather than according to a protocol that would otherwise be used to transmit that traffic.

In accordance with still other embodiments of the present invention, instrumentation added to the network stack at a receiving host operates to unpack encapsulated data for delivery to a recipient application. In addition, the instrumentation at the receiving host retrieves the information added at the sending host for test purposes. In accordance with still other embodiments of the present invention, the receiving host can repackage the information related to testing of the network and add additional test information. The test information may then be placed in a response packet formatted according to the protocol being tested and returned to the originating host. When a response packet is received at the originating host, network performance metrics such as roundtrip transit time (delay) and jitter can be determined. In addition, in connection with a flow of data involving a number of data packets, information regarding packet loss can be obtained.

In accordance with further embodiments of the present invention, the instrumentation in the network stack of the originating host directs the packet encapsulating the original data traffic to a port on the receiving host associated with the protocol being tested, rather than the port on the receiving host to which the traffic or data was originally addressed. The network instrumentation on the receiving host then delivers the transmitted data to the recipient application after unpacking that data from the data packet that was addressed to the tested port.

Additional features and advantages of embodiments of the present invention will become more readily apparent from the following discussion, particularly when taken together with the accompanying drawings.

DETAILED DESCRIPTION

Figure 1:
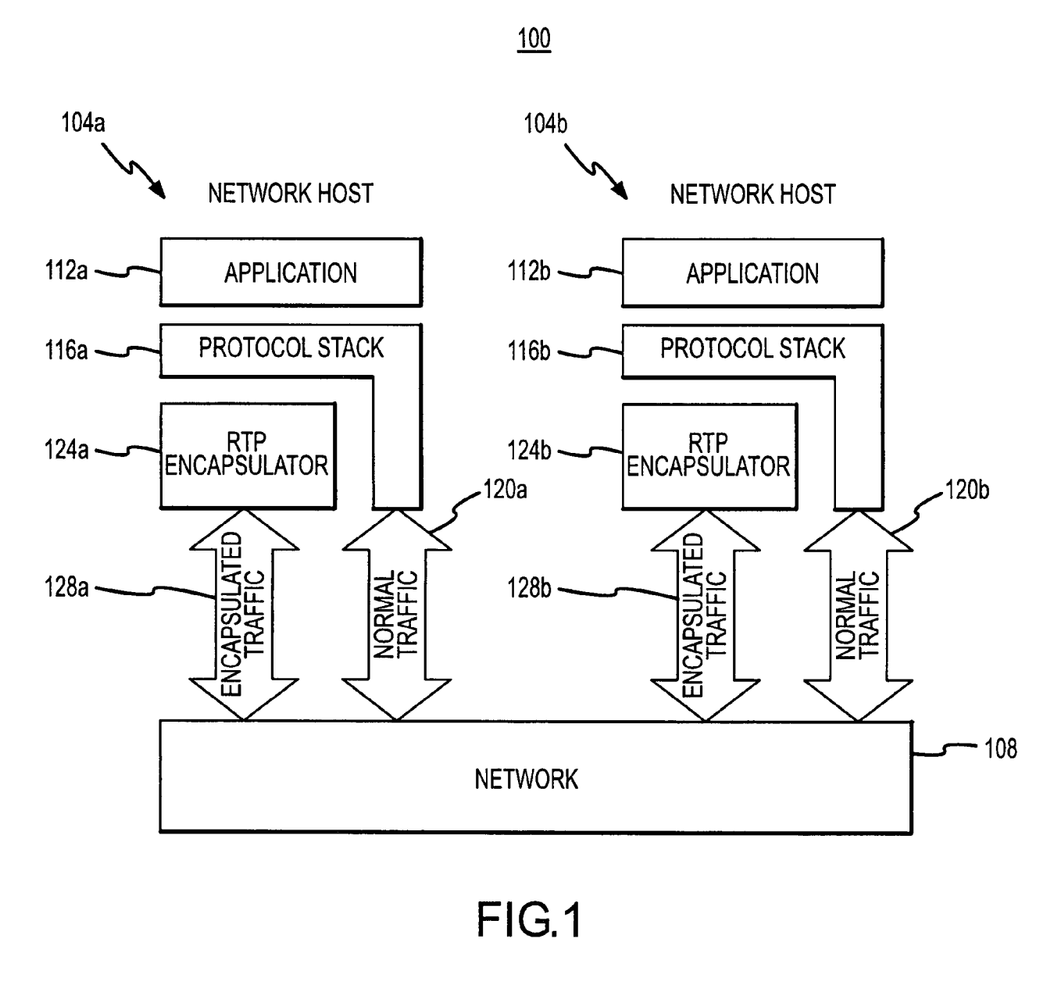
FIG. 1 illustrates network hosts interconnected by a network in accordance with embodiments of the present invention.

With reference now to FIG. 1, components of a system 100 for network protocol performance assessment are illustrated. In general, the system 100 includes a number of network hosts 104a-b, interconnected to one another by a network 108. In general, each network host 104 includes or is associated with an application 112. The application 112 may comprise a source and/or sink for data. As examples, an application 112 may generate data, process data provided, from another application or network entity, or may comprise a communication application for transferring data.

Each network host 104 also generally includes a network protocol stack 116. Although the network protocol stack 116 is not limited to any particular configuration, an example of a network protocol stack 116 includes a transmission control protocol/Internet protocol (TCP/IP) protocol stack. As can be appreciated by one of skill in the art, the network protocol stack 116 of a network host 104 may operate to receive data from the application 112 associated with the network host 104, to create data packets according to the protocol implemented by the network protocol stack 116, and to provide those data packets to the network 108 over a first port 120 for transmission to a recipient network host 104. For example, packets created in the network protocol stack 116a of the first network host 104a are generally passed to the network 108 via a first port 120a. Furthermore, packets created in the network protocol stack 116a of a first network host 104a are generally addressed to a corresponding first port 120b of the recipient network host 104b. In addition, the network protocol stack 116 generally functions to receive data packets, including data packets delivered to a first port 120 of an associated network host 104, to retrieve data contained in those data packets, and to deliver the data to an associated application 112. For example, data packets addressed to the first port 120b of the second network host 104b may be processed by the network protocol stack 116b associated with the second network host 104b, and data contained in such data packets may be delivered to an associated application 112b.

In accordance with embodiments of the present invention, each network host 104 additionally includes a shim inserted in the network protocol stack 116, referred to herein as an encapsulator 124. The encapsulator 124 generally functions to intercept traffic (i.e. data packets) generated by an application 112 from the protocol stack 116. Intercepted data is encapsulated by the encapsulator 124 in test or wrapper data packets that are formatted according to a protocol that is different than the protocol generally used by the network protocol stack 116 to form data packets. The encapsulator 124 also inserts information in the test data packet encapsulating the intercepted data packets. Such information may include an identifier, time stamp, or other data for use in connection with measuring the performance of the network 108. The encapsulator 124 then delivers the test data packet formatted according to the second protocol to the network 108, for instance through a second port 128. As an illustrative example, the network protocol stack 116a on a first host 104a may format data received from an application 112a for transmission according to a first protocol, such as the TCP/IP protocol. One or a number of the TCP/IP data packets are then intercepted by the encapsulator 124a and encapsulated in one or more test data packets formatted according to a second protocol, for example a real time protocol (RTP). In addition to the TCP/IP data packet or packets carrying the traffic generated by the application 112a, the test data packet or packets formed by the encapsulator 124a includes an identifier and a time stamp. The test data packet or packets, carrying the encapsulated data packet or packets as a payload, are then passed by the encapsulator 124a to the network 108 via a second port 128a.

The encapsulator 124 also functions to handle data packets received at the second port 128 of an associated network host 104. In particular, the encapsulator 124 retrieves encapsulated data from test data packets received at the second port 128. The encapsulated data, when removed from the test data packet received at the second port 128, may be in the form of data packets formatted according to the first protocol that normally would have arrived at the host 104 via the first port 120. The retrieved data packets are then provided to the network protocol stack 116 for delivery to the application 112 as if the data had been delivered via the first port 120. In addition, the encapsulator 124 retrieves information from received data packets that can be used in connection with performance testing of the network 108. As an example, a test data packet sent via the second port 128a of a first network host 104a according to a second protocol may be received at the second port 128b of the second network host 104b. The encapsulator 124b then unpacks the encapsulated data packet or packets and the added information regarding network performance. The data packet or packets that had been encapsulated are then passed from the encapsulator 124b to the protocol stack 116b for retrieval of the data from those data packets, and for delivery to the receiving application 112b.

The encapsulator 124 of a network host 104 also may function to provide response packets. By sending response packets more complete network performance information can be obtained. For example, round trip transit times can be determined. In general, an encapsulator 124 formats response packets according to the protocol being tested. In addition, such packets may include information used in connection with testing the performance of the network 108. Such information may include information originally transmitted with encapsulated data, information derived from information originally transmitted with encapsulated data and/or information added by the encapsulator 124 creating the response packet. For example, after the encapsulator 124b on the second network host 104b has unpacked and delivered data packets that were encapsulated to the network protocol stack 116b, and has retrieved information related to network performance, including an identifier and a time stamp indicating the time at which the data packet including information was originally sent from the first network host 104a, the encapsulator 124b may create a response packet. The response packet may include the received identifier, the time stamp from the first network host 104a, a new time stamp indicating the time at which the response packet was sent from the second network host 104b, and/or other information. The response packet is sent to the first network host 104a via the second port 128b of the second network host 104b. Upon receipt of the response packet at the second port 128a of the first network host 104a, the encapsulator 124a may retrieve the information related to performance testing of the network 108, associate a time stamp indicating the time at which the response was received at the first network host 104a, and provide that information to a test application or database. In accordance with embodiments of the present invention, a response packet may be received for some or all encapsulated data packets delivered to a receiving host 104.

Figure 2:
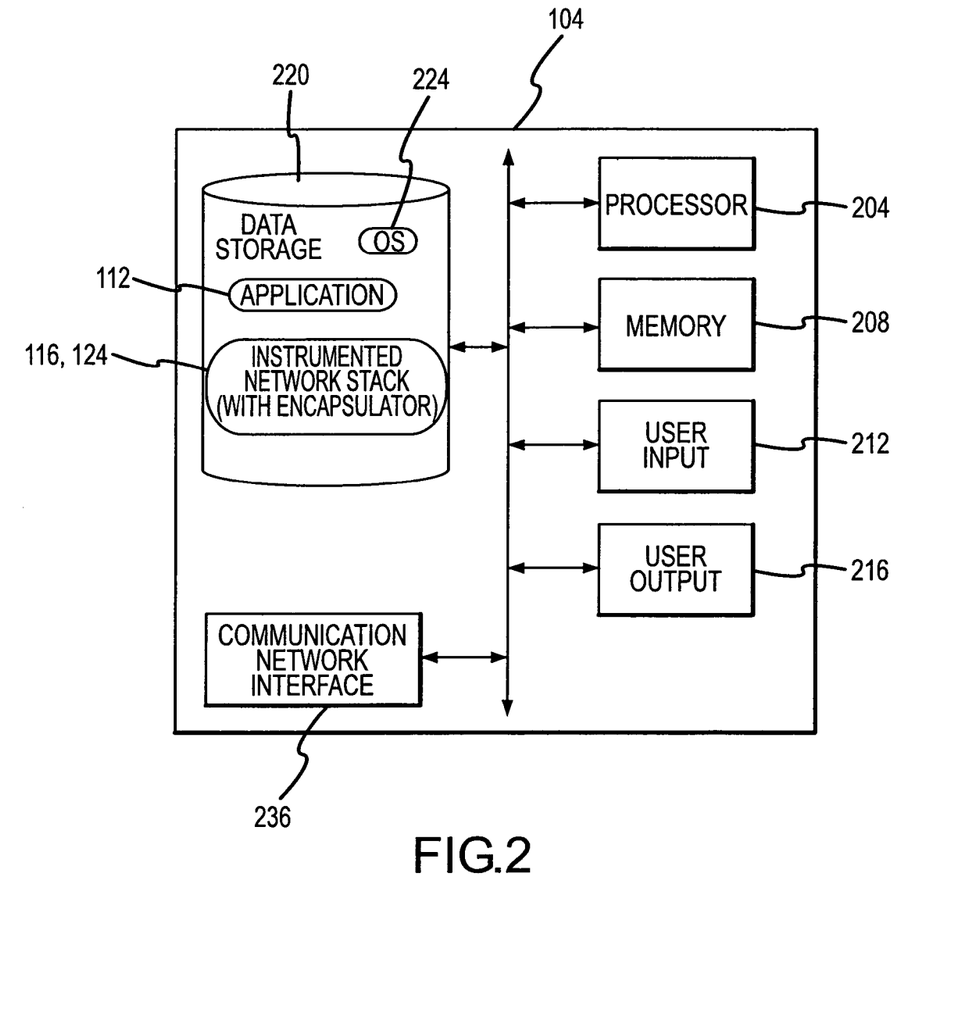
FIG. 2 illustrates components of a network host in accordance with embodiments of the present invention.

With reference now to FIG. 2, components of a network host 104 incorporating an encapsulator 124 in accordance with embodiments of the present invention are depicted in block diagram form. The components may include a processor 204 capable of executing program instructions. Accordingly, the processor 204 may include any general purpose programmable processor, digital signal processor (DSP) or controller for executing application programming. Alternatively, the processor 204 may comprise a specially configured application specific integrated circuit (ASIC). The processor 204 generally functions to run programming code implementing various functions performed by a network host 104, including encapsulation and test operations as described herein.

A network host 104 may additionally include memory 208 for use in connection with the execution of programming by the processor 204 and for the temporary or long term storage of data or program instructions. The memory 208 may comprise solid state memory resident, removable or remote in nature, such as DRAM and SDRAM. Where the processor 204 comprises a controller, the memory 208 may be integral to the processor 204.

In addition, the network host 104 may include one or more user inputs or means for receiving user input 212 and one or more user outputs or means for outputting 216. Examples of user inputs 212 include keyboards, keypads, touch screens, touchpads and microphones. Examples of user outputs 216 include speakers, display screens (including touch screen displays) and indicator lights. Furthermore, it can be appreciated by one of skill in the art that the user input 212 may be combined or operated in conjunction with a user output 216. An example of such an integrated user input 212 and user output 216 is a touch screen display that can both present visual information to a user and receive input selections from a user.

A communication device 104 or server 112 may also include data storage 220 for the storage of application programming and/or data. In addition, operating system software 224 may be stored in the data storage 220. The data storage 220 may comprise, for example, a magnetic storage device, a solid state storage device, an optical storage device, a logic circuit, or any combination of such devices. It should further be appreciated that the programs and data that may be maintained in the data storage 220 can comprise software, firmware or hardware logic, depending on the particular implementation of the data storage 220.

The data storage 220 generally includes one or more applications 112. An example of an application 112 includes applications that can be used to generate or modify data, such as word processing, spreadsheet or publishing applications, or any other type of application capable of generating or modifying data. Other examples of applications 112 include communication applications and mass storage applications. In addition, the data storage 220 of a network host 104 in accordance with embodiments of the present invention may include a network stack 116 that has been instrumented to include an encapsulator 124 as described herein. The encapsulator 124 may be integrated into the network protocol stack 116, or the network protocol stack 116 and the encapsulator 124 may exist as separate programs or applications.

A communication device 104 or server 112 may also include one or more communication network interfaces 236. Examples of communication network interfaces 236 include a network interface card, a modem, a wireline telephony port, a serial or parallel data port, or other wireline or wireless communication network interface.

Figure 3:
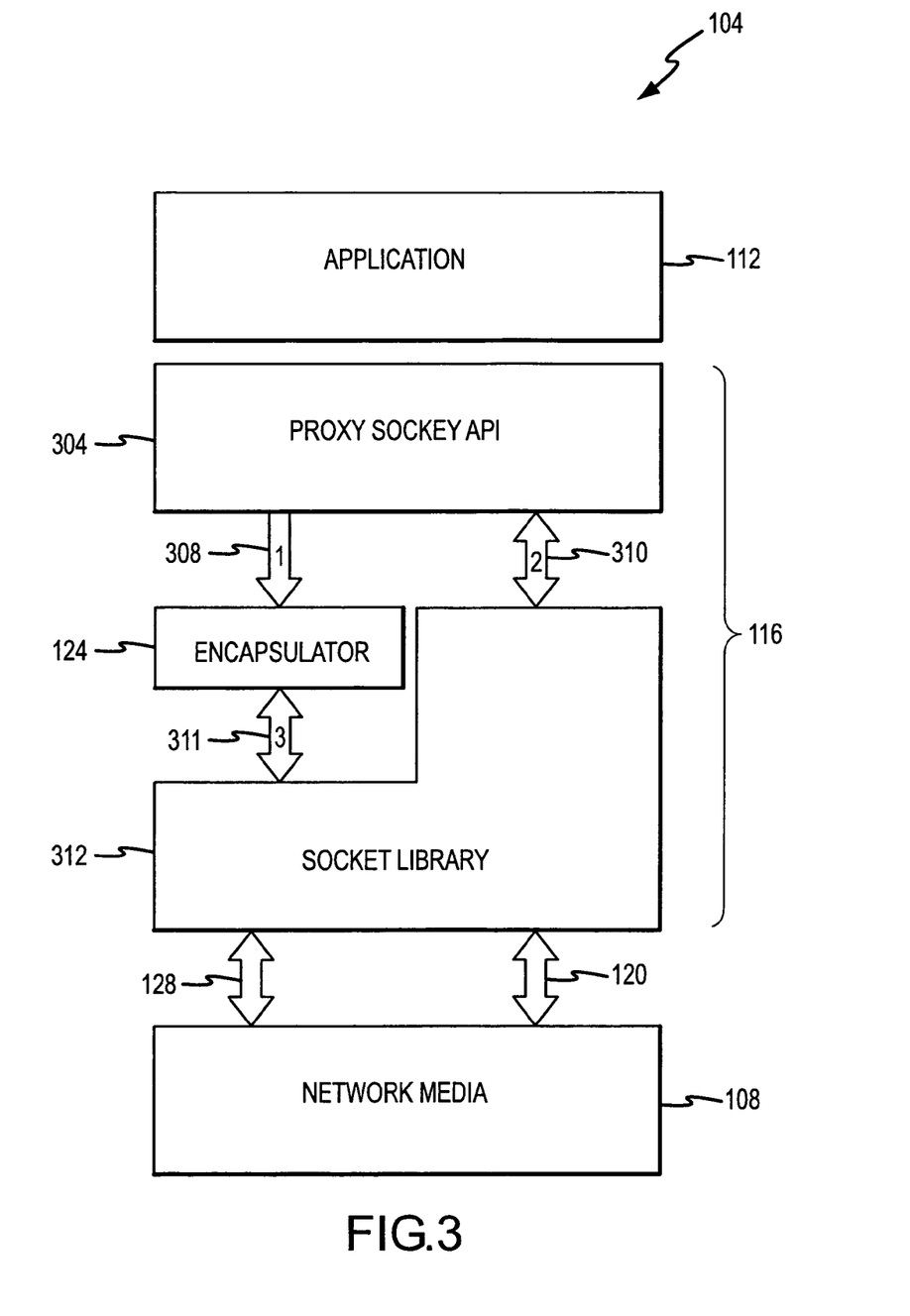
FIG. 3 illustrates the relationship between software associated with a network host and network media in accordance with embodiments of the present invention.

With reference now to FIG. 3, the relationship between software associated with a network host 104 and the network 108 is illustrated. In particular, FIG. 3 illustrates the operation of the encapsulator 124 in relation to other software components on a network host 104. The application 112 running on or associated with the network host 104 communicates with other applications 112 running on or associated with other network hosts 104. When an application 112 wants to use the network 108 to communicate, it does so through an application programming interface 304, generally provided as part of the network protocol stack 116. The encapsulator 124 generally comprises software that is executed to observe and intercept communication requests and/or data packets as they pass through the network stack from the application 112 to the network 108 layer. Furthermore, with respect to packets received at a network host 104, the encapsulator 124 observes, intercepts test data packets encapsulating other data packets, and retrieves encapsulated data packets as they pass from the network 108 layer through the protocol stack to the application 112.

At the interface between the application programming interface 304 and the encapsulator 124 (Location 1 308), the encapsulator 124 determines if a network request is destined for another host 108 that has an encapsulator 124 installed, if the traffic being sent is suitable to be encapsulated into a packet of the protocol type being tested, if it is time to schedule a test, and/or if any other eligibility criteria are met. If the network transfer does not meet the encapsulator's 124 requirements, the traffic comprising the transfer passes through the network stack normally, by passing from the application programming interface 304 directly to the socket library 312 at location 2 310 for delivery to the network 108 over a first port 120.

If the network transfer meets the requirements of the encapsulator 124, the encapsulator 124 encapsulates the data packets (i.e. the traffic being sent) to be transferred in data packets formatted according to the protocol being tested, and adds additional information for use in connection with performance testing to form a test data packet. Accordingly, as used herein a "test data packet" is a data packet formatted according to a protocol to be tested that contains data packets formatted according to another protocol and that contains test information. The test data packet is then provided to the socket library 312 at its interface between the encapsulator 124 and the socket library 412 (location 3 311) for delivery to the network 108 over a second port 120.

Figure 4:
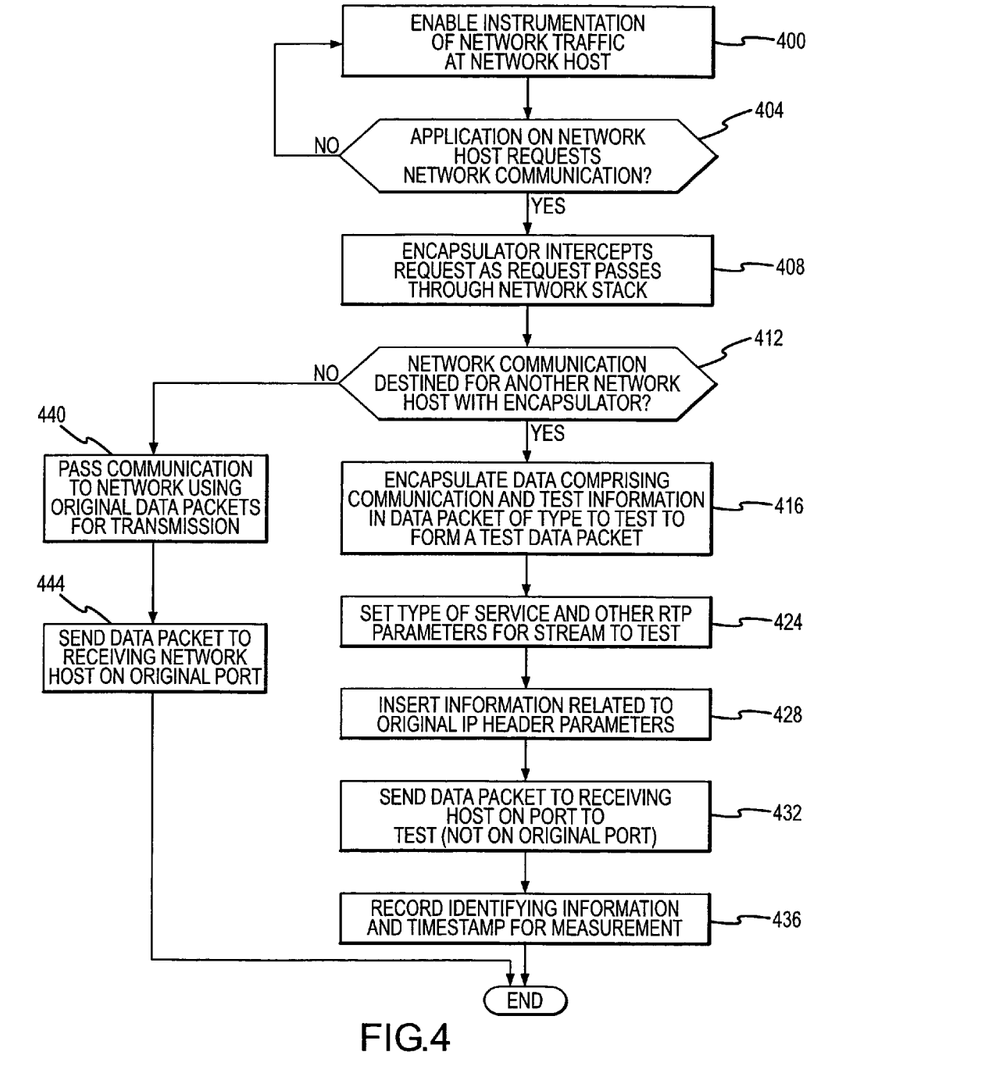
FIG. 4 is a flowchart illustrating aspects of the operation of a system for network performance testing in accordance with embodiments of the present invention.

With reference now to FIG. 4, aspects of the operation of a system 100 for network protocol performance assessment in accordance with embodiments of the present invention are illustrated. Initially, at step 400, instrumentation of network traffic at a network host 104 is enabled. A determination may then be made as to whether an application 112 on the network host 104 requests use of the network 108 for a communication (step 404). If no request to use the network 108 by an application 112 is detected, the process may idle at step 404.

Upon detecting a request by an application 112 to use the network 108 for communication, for example to transfer data, the encapsulator 124 intercepts the request as that request passes through the network protocol stack 116 (step 408). A determination may then be made as to whether the network communication is destined for another network host 104 with an encapsulator 124 (step 412). This determination may be made by an encapsulator 124 on the sending network host 104. Alternatively, the encapsulator 124 at the sending host 104 may encapsulate all or some fraction of the outgoing traffic.

If the communication is destined for a network host 104 having an encapsulator 124, the data packet or packets comprising the communication or transfer from the sending host 104 and test information are encapsulated in a test data packet or packets of the type to test formed by the encapsulator 124 or at the direction of encapsulator 124 (step 416). For example, if the network 108 is to be tested for real-time protocol performance, data packets comprising the communication are encapsulated in an RTP test data packet. The test information that is inserted in the test data packet with the data packet or packets for transfer may include an identifier. In addition, the instrumentation information may include information for test purposes, such as a time stamp. The type of service and other parameters, for example RTP parameters, for the test data packet are then set as appropriate for the stream to test (step 424). In addition, information related to the original IP header parameters for the traffic that the application 112 wishes to send may be inserted (step 428). The test data packet is then sent to the receiving host 104 on the port to test (step 432). As can be appreciated by one of skill in the art after consideration of the description provided herein, the ports on the receiving host 104 to which the test data packet encapsulating the original traffic is sent is different than the port to which the traffic is originally addressed. In addition, the identifying information, time stamp, and/or other information related to testing the performance of the network 108 is recorded at the sending host (step 436).

If at step 412 it is determined that the network communication requested by the application 112 is not destined for another host 104 with an encapsulator 124, or if it is determined that the communication is otherwise ineligible for encapsulation, a data packet using the original IP header parameters may be passed to the network for transmission (step 440). The data packet using the original IP header parameters may then be sent to the receiving network host 104 on the original port (step 444). After sending a normal data packet to a receiving host 104 (at step 444), or after sending a test packet to a receiving host (at step 432) and recording identifying information (at step 436), the process for sending network traffic may end.

Figure 5:
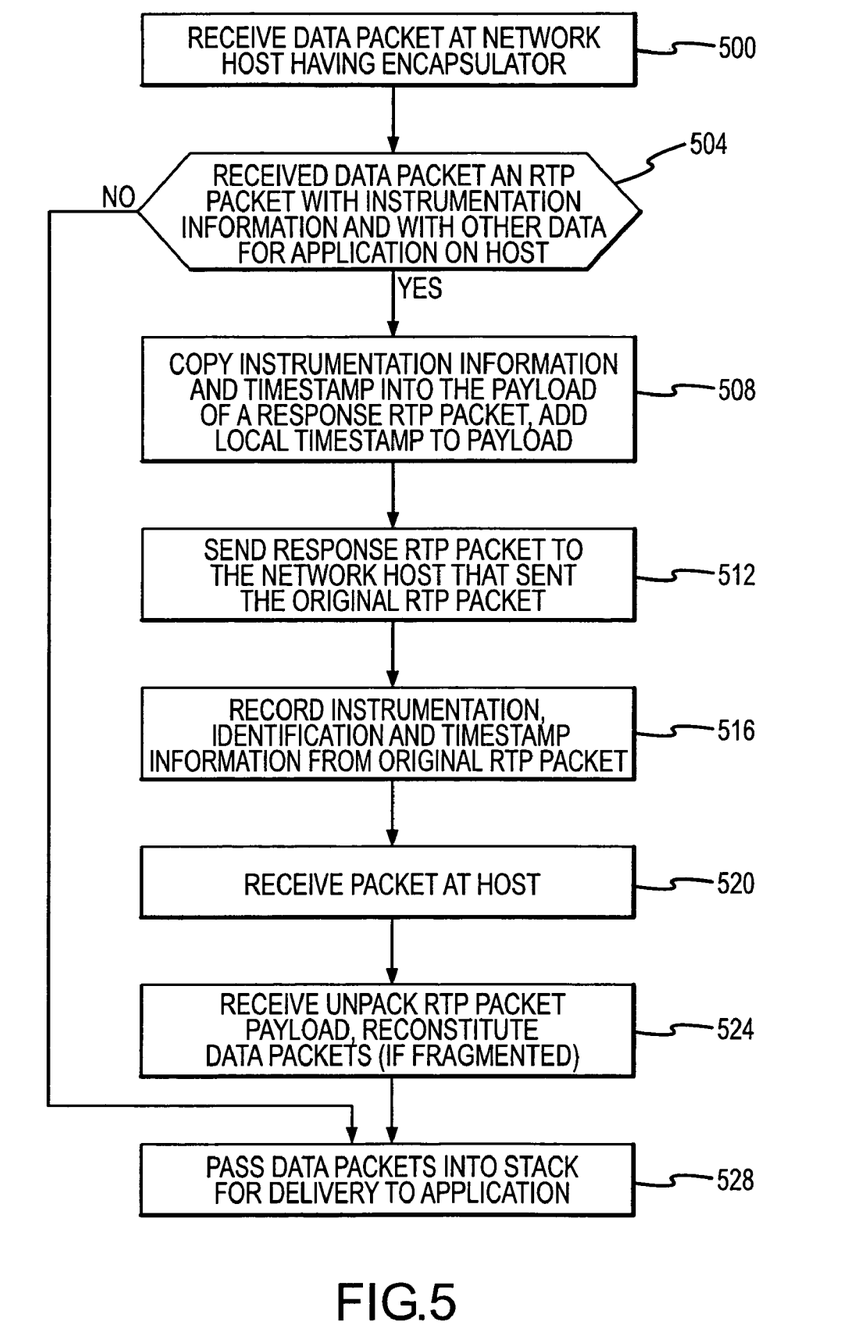
FIG. 5 is a flowchart illustrating other aspects of the operation of a system for network performance testing in accordance with embodiments of the present invention.

With reference now to FIG. 5, additional aspects of the operation of a system 100 for testing network performance in accordance with embodiments of the present invention are illustrated. At step 500, a data packet is received at a network host 104 having an encapsulator 124. A determination may then be made as to whether the received data packet is an RTP test packet (or other type of test packet in a protocol whose performance on the network 108 is being tested) having instrumentation information and having data for an application 112 on that host 104 has been received. If it is determined that a test data packet has been received, the instrumentation information is copied into the payload of a response packet, and additional instrumentation, such as a local time stamp is added to the payload (step 508). The response packet is then sent to the network host 104 that sent the original packet (step 512). At the time the response packet is sent, instrumentation information, such as identification and/or time stamp information, is recorded from the original packet at the receiving host (step 516).

The test packet payload including the data packets comprising the data for the application 112 is then unpacked by the encapsulator 124 on the receiving host 104 (step 524). In addition, if the data comprising the payload is fragmented over a number of data packets, it may be reconstituted by the network protocol stack 116. The data packets are then passed into the stack 116 for delivery to the application 112 (step 528).

If it is determined that the data packet received at the receiving network host 104 does not include instrumentation information, it may not be operated on by the encapsulator 124. Instead, it is passed to the network protocol stack 116 for delivery to the application 112 as a normal (i.e. as a non-test) data packet (step 528).

Figure 6:
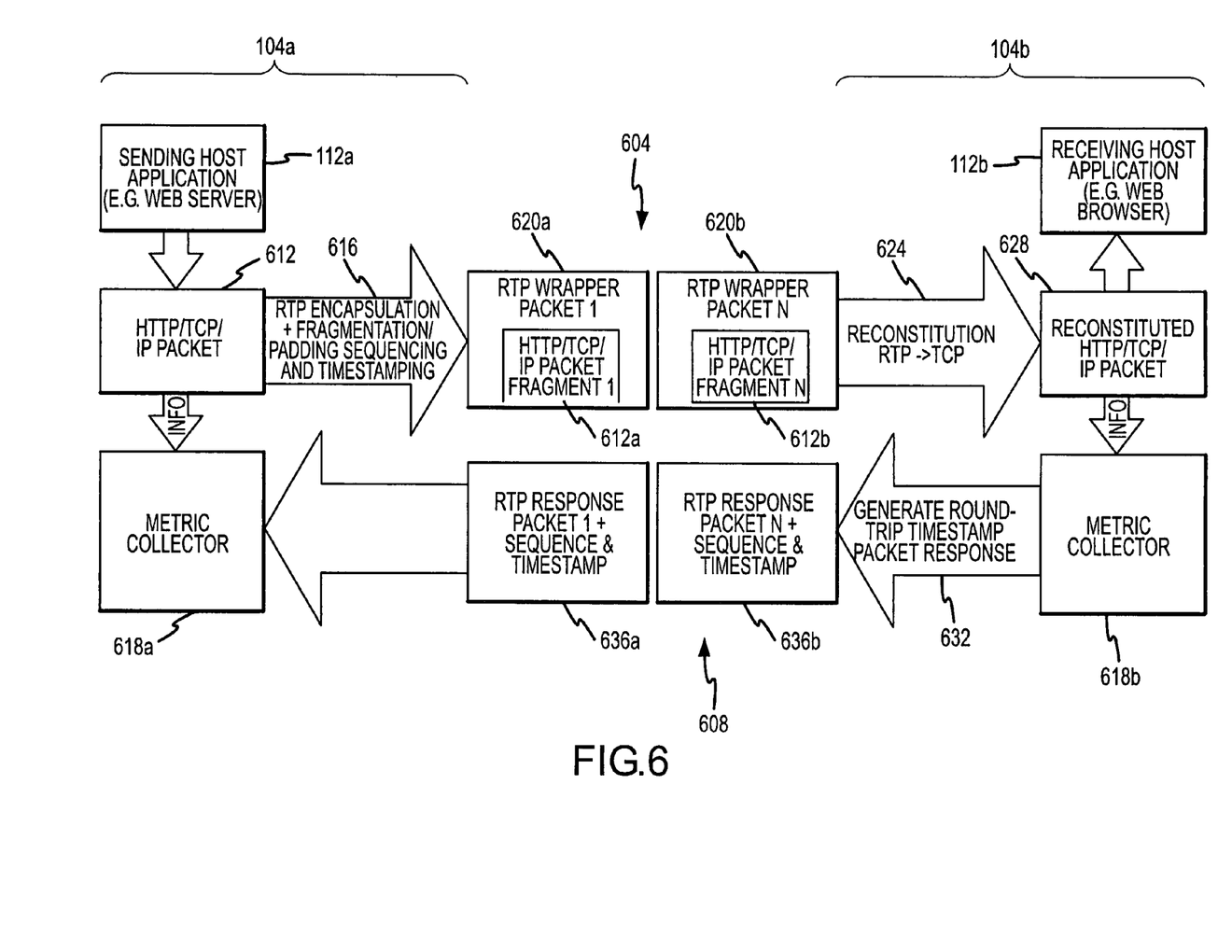
FIG. 6 is a block diagram illustrating a process flow in accordance with embodiments of the present invention.

With reference now to FIG. 6, a process flow in accordance with embodiments of the present invention is illustrated. In particular, a process flow in accordance with embodiments of the present invention that includes an initiation packet flow 604 and a response packet flow 608 is illustrated. As depicted in FIG. 6, a sending host application 112a provides data for transmission as the payload of an IP data packet 612. The IP data packet 612 may be formed by operation of the protocol stack 116a associated with the sending host application 112a. The IP data packet 612 is then encapsulated into a test or wrapper packet or packets, and instrumentation information is associated with the test data packet (shown in FIG. 6 at process arrow 616). Encapsulation and instrumentation may be performed by operation of the encapsulator 124a associated with the protocol stack 116a that formed the original IP data packet 612. As a result of the encapsulation and instrumentation, a test or wrapper data packet 620 is formed. Furthermore, the IP data packet 612 encapsulated by the test or wrapper packets 620 may be divided into fragments that are associated with different test or wrapper packets 620. For example, in FIG. 6 a first wrapper packet 620a contains fragment 1 of an IP data packet 612a, while fragment n 612b is included in wrapper packet n 620b.

The test or wrapper data packets 620 are transmitted across the network 108 as the initiation flow 604. The wrapper packets 620 are then received at the encapsulator 124b associated with the receiving host application 104b, and reconstitution or recovery of the original IP data packet 612 is performed (shown at process arrow 624). The recovered data packet 620a is then delivered to the receiving host application 104b. As can be appreciated by one of skill in the art from the description provided herein, the recovered data packet 620a may be identical to the form of that packet when it was initially formed by the protocol stack 116a associated with the sending host application 112a.

When the instrumentation information is added as part of the encapsulation process 616, instrumentation information is also stored in a metric collector 618a. Information maintained in the metric collector 618a may include the time stamp information added as part of the encapsulation process and the identifier associated with the encapsulation packet or packets formed.

Instrumentation data included in the wrapper packet 620 is passed to a metric collector 618b, which may be associated with the receiving host 104b. The collected information may then be modified and/or added to additional instrumentation information as part of a response packet generation process 632. In accordance with the embodiments of the present invention, a response packet 636 may be generated to correspond to each wrapper packet 620 received at the receiving host 104b. For example, a response packet 1 636a may be generated that corresponds to the wrapper packet 1 620a received at the receiving host 104b. The response packet 1 636a may include the identifier, sequence number, time stamp or other information added as a part of the instrumentation of the wrapper packet 620a and/or the response packet 636a. Similarly, a response packet n 626b may be generated corresponding to wrapper packet n 620b.

At the sending host 104a, instrumentation information is recovered from received response packets 636. Such instrumentation information may be recovered by the encapsulator 124a associated with the sending host 104a. The instrumentation information recovered from the response packets 636 may be delivered to the metric collector 618a.

Although certain examples provided in the present description have discussed the encapsulation TCP/IP data packets in test or wrapper packets comprising RTP data packets, it should be appreciated that embodiments of the present invention are not so limited. In particular, embodiments of the present invention may be applied in connection with the wrapping or encapsulation of a data packets formatted according to any protocol into another data packet formatted in accordance with any other protocol and including instrumentation information. Accordingly, embodiments of the present invention may be applied to test the performance of networks in connection with the delivery of data streams formatted according to a first protocol by transporting data formatted according to a second protocol using data packets formatted according to the first protocol. Furthermore, the first and second protocols may both operate at the same network layer or level according to a layered model of the applicable network.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described herein above are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method for testing network performance, comprising:
   detecting on a first host at least a first data packet to be sent from a first application running on said first host over a network, wherein said first data packet is formatted according to a first protocol, wherein said first application is a source of native traffic, wherein said native traffic includes said first data packet, wherein said first data packet does not include network test data, wherein said first data packet is addressed to a second host only, and wherein said first protocol comprises a protocol corresponding to a first network layer;
   a first encapsulator running on said first host intercepting said first data packet;
   encapsulating by said first encapsulator on said first host said first data packet into a second data packet to form a first test data packet, wherein said second data packet is formatted according to a second protocol, wherein said second protocol comprises a protocol corresponding to said first network layer, wherein said first test data packet is addressed to said second host only, and wherein said first test data packet includes said first data packet and further includes first information including performance testing information; and
   providing said first test data packet from said first host to said network for transmission.

2. The method of claim 1, further comprising:
   transmitting said first test data packet across said network to a second host according to said second protocol.

3. The method of claim 2, wherein said first data packet is addressed to a first port on said second host, and wherein said first test data packet is addressed to a second port on said second host.

4. The method of claim 2, further comprising:
   at said second host:
   receiving said first test data packet;
   detecting said first data packet;
   retrieving by a second encapsulator said first data packet and said first information from said first test data packet, wherein said first information is associated with at least a first network performance metric.

5. The method of claim 4, further comprising: recording at said second host said first information.

6. The method of claim 4, further comprising: at said second host:
   forming a response packet formatted according to said second protocol, said response packet including at least some of said first information;
   providing said response packet to said network for transmission.

7. The method of claim 6, further comprising:
   transmitting said response packet across said network to said first host according to said second protocol;
   at said first host:
   receiving said response packet;
   retrieving from said response packet said at least some of said first information.

8. The method of claim 4, further comprising: passing said retrieved first data packet to a second application.

9. The method of claim 1, wherein said first information includes an identifier and a time stamp.

10. The method of claim 1, wherein said first information includes parameters associated with said first data.

11. The method of claim 1, further comprising:
    determining that said first data is to be sent to a second host that is capable of handling said first test data packet.

12. The method of claim 11, further comprising:
    detecting on said first host second data to be sent from said first application over said first network according to said first protocol;
    determining that said second data is to be sent to a third host that is not capable of handling a second test data packet including said second data and second information;
    transmitting said second data across said network to said third host according to said first protocol.

13. The method of claim 1, wherein said first data packet comprises an Internet protocol header and a transmission control protocol, and wherein said first test data packet comprises an Internet protocol header, a universal datagram protocol header, and a real time protocol header, and wherein said first data packet comprises a payload of said first test data packet.

14. A system for testing network performance, comprising:
    a first host, including:
    means for providing first data;
    means for forming at least a first data packet that contains said first data and that is formatted according to a first protocol, wherein said first data packet is complete with respect to at least a first layer of a layered communication protocol, wherein said first data packet is existing traffic and is not a test packet, and wherein said at least a first data packet is addressed to a second host only; and
    means for interfacing said first host with communication means;
    means for encapsulating said first data packet formatted according to said first protocol in a second data packet formatted according to a second protocol and for inserting first instrumentation information in said second data packet formatted according to said second protocol, wherein said second data packet is complete with respect to said at least a first layer of said layered communication protocol, wherein a payload of said second data packet formatted according to said second protocol includes said first data packet, and wherein said second data packet is addressed to the second host only; and
    communication network means interconnected to said means for interfacing of said first host; and
    a second host including:
    means for interfacing said second host with said communication network means;
    means for retrieving said first data packet formatted according to said first protocol from said second data packet formatted according to said second protocol and for retrieving said first instrumentation information and said first data inserted in said second data packet formatted according to said second protocol; and means for receiving said first data.

15. The system of claim 14, further comprising:
means for forming a response packet at said second host, wherein said response packet includes at least some of said first information and second information.

16. The system of claim 14, further comprising:

means for consuming data, wherein said data transmitted to said second host is delivered to said means for consuming data.

* * * * *